P. J. MADIGAN.
DRINKING FOUNTAIN.
APPLICATION FILED SEPT. 12, 1912.
1,076,988.  Patented Oct. 28, 1913.
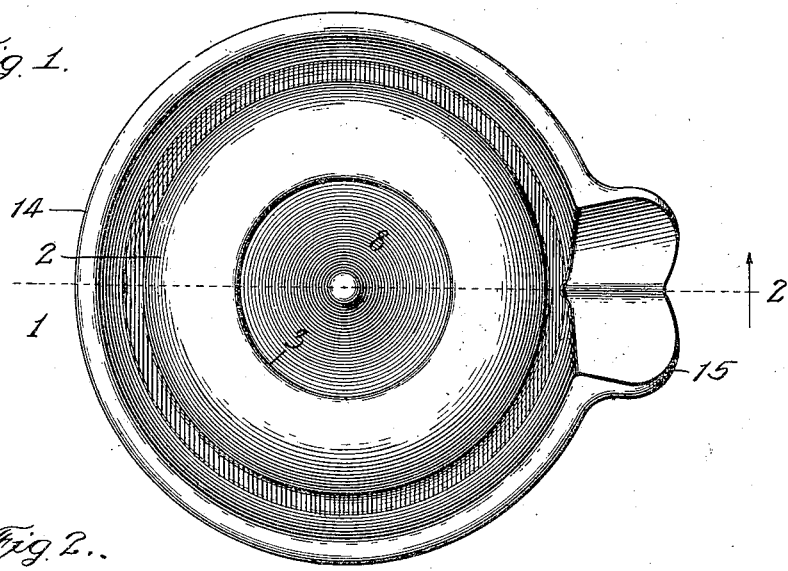
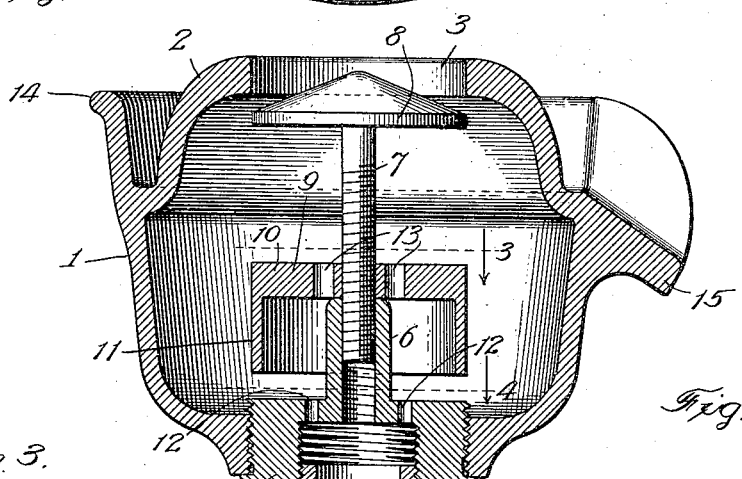
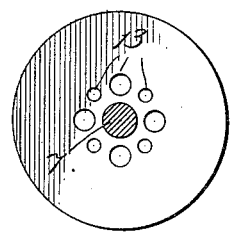
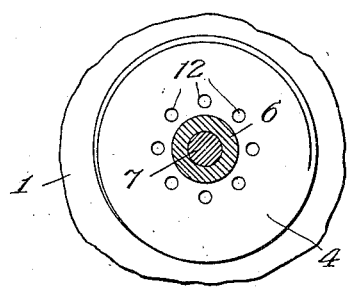
Witnesses:  Inventor:
Patrick J. Madigan
By David H. Fletcher,
Atty.

UNITED STATES PATENT OFFICE.

PATRICK J. MADIGAN, OF CHICAGO, ILLINOIS.

DRINKING-FOUNTAIN.

1,076,988. Specification of Letters Patent. Patented Oct. 28, 1913.

Application filed September 12, 1912. Serial No. 719,988.

*To all whom it may concern:*

Be it known that I, PATRICK J. MADIGAN, a citizen of the United States, residing at Chicago, in the county of Cook and State of Illinois, have invented certain new and useful Improvements in Drinking-Fountains, of which the following is a description, reference being had to the accompanying drawings, forming a part of this specification, in which corresponding letters of reference in the different figures indicate like parts.

The object of my invention is to provide an improved form of drinking fountain or sanitary overflow bowl adapted for use in public buildings and other places where sanitary considerations prohibit the use of the ordinary drinking-cup; one purpose, among others, being to so construct said device as to insure a flow or "bubble" of substantially uniform height above the outlet while maintaining such a contour as not to interfere with the act of drinking.

A further object is to provide means whereby the overflow may be so directed by a trough or conduit to a spout, as to enable a cup or other vessel to be filled therefrom, all of which is hereinafter more particularly described and definitely pointed out in the claims.

In the drawings Figure 1, is a plan view of a fountain bowl embodying the features of my invention, Fig. 2, is a vertical sectional view thereof taken upon the line 2—, Fig. 1, viewed in the direction of the arrow there shown, Fig. 3, is a plan, partly in section, taken upon the line 3, Fig. 2, and Fig. 4, is a plan, partly in section, taken upon the line 4—, Fig. 2.

Referring to the drawings, 1, Figs. 1 and 2, represents generally a hollow bowl-like casing formed from metal or other suitable material, which is drawn inwardly toward the top, as shown at 2, and there provided with a relatively large central discharge opening 3. A screw-threaded opening, preferably of about the same diameter as that of the opening 3, is formed in the bottom of the casing 1, into which is tapped a plug 4, having a screw-threaded bore extending upwardly from the bottom thereof nearly to the top, to serve as a means for attaching the same to a water-supply pipe 5, Fig. 2. Said plug is provided with a central vertical extension 6, which is centrally bored and screw-threaded for the reception of a threaded stem 7, having rigidly formed upon or attached to its upper end, a disk-like deflector 8, which is substantially concentric therewith and of a diameter preferably corresponding substantially to that of the opening 3. The under face of said deflector is preferably flat, while the upper side is conoidal in form with the apex of the cone substantially concentric with the axis of the stem.

A cylindrical deflecting hood or member, generally designated by 9, Figs. 2 and 3, is located immediately above and concentric with the extension 6, said member being provided with a central screw-threaded bore for the reception of the stem 7, which is passed through it as shown. Said cylindrical deflector is provided with a horizontal body-portion 10, having a depending peripheral flange 11, the bottom of which is sufficiently raised above the top of the plug 4, to permit the free passage of water.

The deflector 8, is intended to be adjusted in height in its relation to the main discharge opening to conform to varying requirements of water pressure. This may be accomplished by loosening the member 9, which acts as a lock-nut, turning the stem 7, to secure the desired adjustment and then screwing the member 9 down to lock it in place.

The plug 4, is provided with a plurality of vertical bores or supply openings 12, which serve to direct jets of water upwardly beneath the body of the deflector 9. Similar openings 13, are formed in said body, through which jets of water may flow upwardly around the stem 7, against the bottom of the deflector 8. An outwardly and upwardly projecting flange 14, is formed upon the periphery of the bowl, preferably near the top, which forms a trough or conduit around the bowl, communicating with a spout 15, for the purpose hereinafter stated.

The operation of said device is as follows: Water under pressure, being admitted through the service-pipe 5, is projected upwardly into the cylindrical deflector 9, against the under face of the body 10, but not directly into the openings 13 which are somewhat out of alinement with the openings 12. The main body of the inflowing water is, therefore, directed downwardly and laterally beneath the depending flange 11, into contact with the inner wall of the bowl, from whence it is deflected upwardly and thence inwardly toward the annular opening between the periphery of the deflector 8 and the main outlet opening 3. A portion of the water, however, is caused to flow upwardly in vertical jets around the stem 7 and against the bottom of the deflector 8, by which it is spread laterally and caused to meet the upward and inward flow described from the walls of the bowl. This counter-flow so breaks the force of that opposing it that a conoidal-shaped "bubble" of the desired height and force is formed above the deflector 8, which bubble is caused to maintain its form without irregularity or spurting. The shape and height of the bubble may be varied by adjusting the height of the deflector 8, which may be readily adapted to varying degrees of pressure. The overflow from the discharge opening is caught by the flange 14, and is directed through the trough formed thereby to the spout 15, which may be utilized for filling cups or other receptacles.

I do not wish to be limited to the exact construction shown, inasmuch as it may be varied without departing from the spirit of the invention.

Having thus described my invention, what I claim and desire to secure by Letters-Patent is:

1. The combination in a drinking-fountain, of a hollow casing having an upwardly directed intake opening at the bottom and a discharge opening at the top, the walls of said casing being drawn inwardly toward said discharge opening, a central support within said casing, a hollow cylindrical deflecting hood open at the bottom, said hood being mounted upon said central support above said intake opening and provided with a plurality of openings in the top, there being a space between the bottom of said hood and that of said casing, and a disk-like deflector above said hood, said deflector having a screw-threaded stem extending through the top of said hood and tapped into said central support.

2. The combination in a drinking-fountain, of a hollow casing having therein a central support extending upwardly from the bottom, said support being surrounded by upwardly directed intake openings, the upper walls of said casing being drawn inwardly to a discharge opening at the top, a horizontal disk-like deflector arranged in close proximity to said discharge opening, said deflector having a screw-threaded stem tapped into said central support, and a hollow cylindrical hood screwed upon said stem to form a lock-nut for the latter when adjusted, said hood being open at the bottom, provided with vertical openings at the top and having a space between its bottom and that of said casing.

3. The combination in a drinking-fountain of a hollow casing having therein an upwardly directed intake opening, a central support extending upwardly from the bottom of said casing, the upper walls of the latter being drawn inwardly to a discharge opening at the top, a controlling disk having a diameter not exceeding that of said discharge opening, said disk having a screw threaded stem tapped into said central support to provide for the vertical adjustment of said disk to conform to varying water pressures and a hollow cylindrical hood located between said disk and the bottom of said casing, there being a space between the bottom of the hood and the bottom of the casing to permit a lateral outflow beneath all parts of the hood.

In testimony whereof, I have signed this specification in the presence of two subscribing witnesses, this 10th day of September, 1912.

PATRICK J. MADIGAN.

Witnesses:
   DAVID H. FLETCHER,
   JENNIE L. FISKE.

---

Copies of this patent may be obtained for five cents each, by addressing the "Commissioner of Patents, Washington, D. C."